(12) United States Patent
Archambault et al.

(10) Patent No.: US 9,110,684 B2
(45) Date of Patent: Aug. 18, 2015

(54) DATA SPLITTING FOR RECURSIVE DATA STRUCTURES

(75) Inventors: Roch G. Archambault, North York (CA); Shimin Cui, Toronto (CA); Stephen Curial, Edmonton (CA); Yaoqing Gao, North York (CA); Raul E. Silvera, Woodbridge (CA); Peng Zhao, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1548 days.

(21) Appl. No.: 11/775,848

(22) Filed: Jul. 10, 2007

(65) Prior Publication Data

US 2009/0019425 A1   Jan. 15, 2009

(51) Int. Cl.
*G06F 9/44* (2006.01)
*G06F 9/45* (2006.01)

(52) U.S. Cl.
CPC .................................. *G06F 8/4442* (2013.01)

(58) Field of Classification Search
CPC .................................................... G06F 8/4442
USPC .......................... 717/140–145, 149–161, 120
See application file for complete search history.

(56) References Cited

U.S. PATENT DOCUMENTS

| 7,013,459 | B2 | 3/2006 | Kuch et al. |
| 2004/0128661 | A1 | 7/2004 | Ghosh et al. |
| 2005/0246700 | A1 | 11/2005 | Archambault et al. |
| 2006/0095460 | A1 | 5/2006 | Iyengar et al. |

OTHER PUBLICATIONS

Lattner et al., "Automatic Pool Allocation for Disjoint Data Structure", 2002, CiteSeerX, pp. 1-12.*
Michael D. Ernst, "Dynamically Discovering Likely Program Invariants", 2000, University of Wahington, WA, pp. i-vi, 1-128.*
Luk, Chi-Keung, et al; Compiler-Based Prefetching for Recursive Data Structures; ASPLOS VII Oct. 1996, ACM.

* cited by examiner

*Primary Examiner* — Ted T Vo
(74) *Attorney, Agent, or Firm* — Steven M. Greenberg, Esq.; CRGO Law

(57) ABSTRACT

Embodiments of the present invention provide a method, system and computer program product for the data splitting of recursive data structures. In one embodiment of the invention, a method for data splitting recursive data structures can be provided. The method can include identifying data objects of a recursive data structure type, such as a linked list, within source code, the recursive data structure type defining multiple different data fields. The method further can include grouping the data objects into some memory pool units, each of which can contain the same number of data objects. Each memory pool unit can be seen as an array of data objects. The method can include data splitting, which could be maximal array splitting in each different memory pool unit. Finally, the method can include three different approaches, including field padding, field padding and field splitting, to handle irregular field sizes in the data structure.

15 Claims, 2 Drawing Sheets

DATA SPLITTING FOR RECURSIVE DATA STRUCTURES

BACKGROUND OF THE INVENTION

1. Field of the Invention

The present invention relates to the field of computer program code performance tuning and more particularly to data splitting of data structures in a computer program.

2. Description of the Related Art

Software development has evolved over time from direct specification of a sequence of processor instructions, to the interpretation of high level source code into a sequence of processor instructions, to the compilation of high level source code into a sequence of processor instructions, to the compilation of high level source code into interpretable intermediate code able to be interpreted at run-time into a sequence of processor instructions. Initial software development focused on the delivery of functionality of code irrespective of the performance of the code at execution time. Over time, however, the complexity of software compels strong consideration of the performance implications of design choices in software development.

To address performance considerations in software development, software developers often performance tune program code. Performance tuning not only involves the optimized choice of operative structures such as looping constructs, but also performance tuning relates directly to the selection and arrangement of data structures in order to optimize memory access. In particular, performance tuning of data structures in program code often involves the consideration of the optimal utilization of cache memory when executing program code. The use of aggregate data types like arrays within program code can directly impact the optimal utilization of cache memory.

In an aggregate data type, it tends to be the case that frequently accessed fields are placed adjacent to sparingly accessed fields mostly due to the style of programming in which the structure of an aggregate data type intends to impart semantic meaning to the reader as opposed to optimal performance of the data type once compiled for execution. Placing frequently accessed fields adjacent to sparingly accessed fields in an aggregate data type, however, can detract from memory performance because the sparingly accessed fields—often referred to as "cold fields"—pollute the data cache and waste memory bandwidth at the expense of the frequently access fields, commonly referred to as the "hot fields".

Data splitting represents one approach to the remediation of the problem of cache pollution and memory bandwidth waste due to the structuring of an aggregate data type. Contemporary data splitting strategies include affinity-based splitting, frequency-based splitting and maximal splitting. Affinity-based splitting groups fields according to the reference affinity between these fields. Therefore, only fields that are tend to be accessed together at runtime are placed into the same data structure. Frequency-based splitting, by comparison, splits a data structure into two, one of which holds the hot fields and the other one of which hosts the cold fields. Finally, maximal splitting splits each field of a data structure into a separate new data structure. For an array type data structure, each data structure field is stored in an independent array after splitting. Studies show the maximal splitting technique to be the most effective of the foregoing techniques.

Contemporary splitting techniques generate a base array which takes the role of the original array before the transformation. Fields that are not held by the base array are referred to as satellite fields and form the satellite arrays. To access the satellite fields in the program, extra instructions are inserted into the program code to calculate the address of the satellite field. Consequently, the overhead of accessing the satellite fields can become a serious performance problem when the satellite fields are frequently accessed at runtime.

Existing data splitting technologies suffer important drawbacks. First, existing splitting technologies only handle array of structures and do not handle recursive data structures such as linked lists, trees, graphs. Recursive data structures, however, are known to be popular in many programs. Second, the addressing method of existing data splitting technology is known to be inefficient and can result in a significant increase in the number of runtime instructions.

BRIEF SUMMARY OF THE INVENTION

Embodiments of the present invention address deficiencies of the art in respect to data splitting for performance management of program code and provide a novel and non-obvious method, system and computer program product for the data splitting of recursive data structures. In one embodiment of the invention, a method for data splitting recursive data structures can be provided. The method can include identifying a set of data objects of the same recursive data structure type, such as a linked list, within source code, the recursive data structure type defining multiple different data fields. The method further can include grouping the data objects into some memory pool units, each of which can contain the same number of data objects. Each memory pool unit can be seen as an array of data objects. The method can include data splitting, which could be maximal array splitting in each different memory pool unit. Finally, the method can include three different approaches, including field padding, field padding and field splitting, to handle irregular field sizes in the data structure.

In one aspect of the embodiment, grouping the data objects into a common set of memory pool units can include inserting a call to initialize a memory pool unit set for the data object of the identified recursive data structure type, replacing an allocation call for the data object with a call to an allocation routine in an interface to a manager of the memory pool, and further replacing a de-allocation call for the data object with a call to a de-allocation routine in the interface to the manager of the memory pool. In the allocation routine, the manager can group the data objects of the common data type into a common set of memory pool units. In contrast, in the de-allocation routine, the manager can free access to the memory pool unit set. In another aspect of the embodiment, the method further can include padding the data fields in the data object to be of a uniform size, coalescing data fields of like size in a common memory pool unit, or splitting a larger field into smaller fields so that all of the fields are of the same size.

In another embodiment of the invention, a software development data processing system can be provided. The system can include a compiler, a memory pool set, a memory pool manager for the memory pool set, and maximal array splitter coupled to the memory pool and configured to data split each different memory pool unit in the memory pool. The manager can include program code enabled to identify a data object of a recursive data structure type, such as a linked list, within source code, and to group data objets into a common set of the memory pool. Optionally, the memory pool manager can be a linkable library including an interface to a memory pool unit set initialization routine, a memory pool unit initialization routine, an allocation routine and a de-allocation routine.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for data splitting of recursive data structures. In accordance with an embodiment of the present invention, individual recursive data structures can be identified in program source code. The fields within each identified recursive data structure can be grouped into a common set of memory pool units in a memory pool with individual memory pool units holding fields allocated with temporal proximity to one another. Optionally, irregularly sized ones of the fields can be normalized to uniform size. Thereafter, each different memory pool unit can be subjected to data splitting, for example maximal data splitting. In this way, the performance enhancement provided by maximal data splitting can be extended to recursive data structures.

Figure 1:
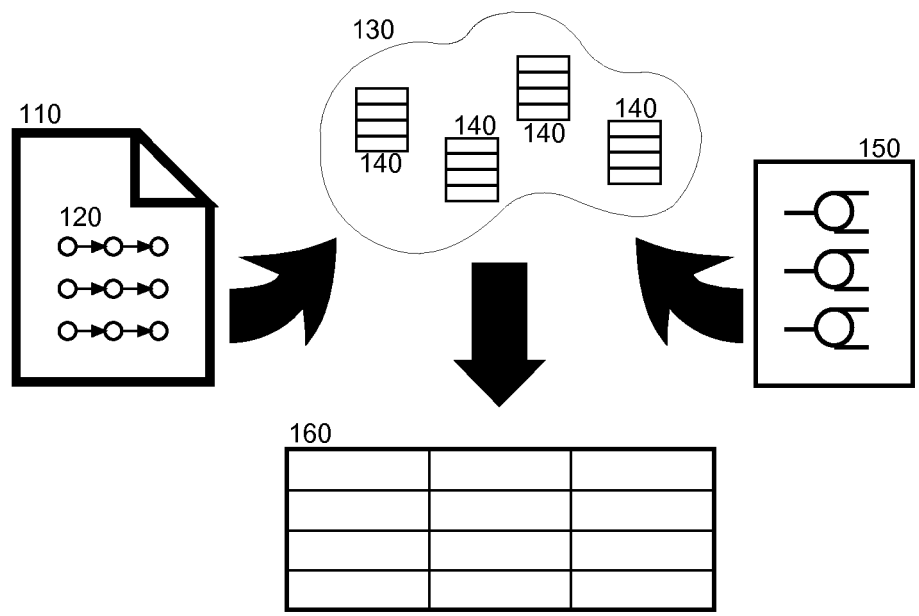
FIG. 1 is a pictorial illustration of a process for data splitting of recursive data structures.

In further illustration, FIG. 1 is a pictorial illustration of a process for data splitting of recursive data structures. As shown in FIG. 1, source code 110 can include one or more defined instances of a recursive data structure 120. A recursive data structure 120, as defined by the United States Department of Commerce, National Institute of Standards and Technology, is a data structure that is partially composed of smaller or simpler instances of the same data structure. For instance, a recursive data structure can include a tree composed of smaller trees and leaf nodes, while a list can include other lists as elements. A linked list represents an embodiment of a recursive data structure.

Each instance of a recursive data structure 120 in the source code 110 can be identified and the fields within each instance of a recursive data structure 120 can be grouped and stored within individual ones or a set of arrays 140 in a memory pool 130. Memory allocations and de-allocations for the instances of the recursive data structure 120 can be supplanted with allocation and de-allocation calls to the memory pool 130 to ensure proper grouping of the fields into the individual ones or the set of arrays 140. Thereafter, a data splitter 150, for instance a maximal data splitter, can process the individual ones or the set of arrays 140 to produce an optimal arrangement of a base with satellite arrays 160.

Figure 2:
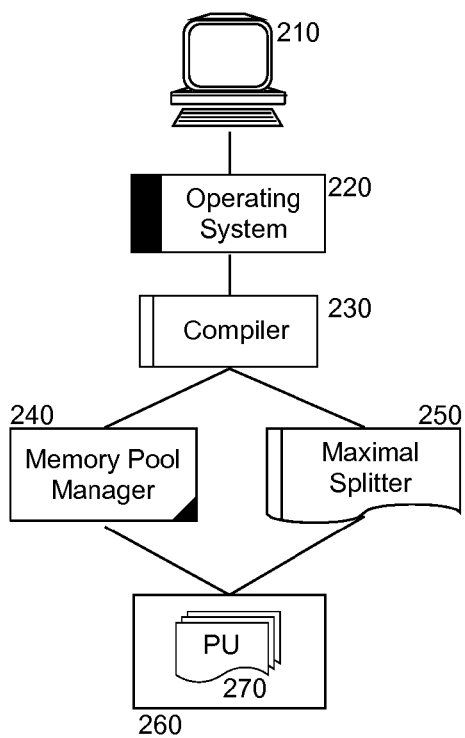
FIG. 2 is a schematic illustration of a software development data processing system configured for data splitting of recursive data structures; and, FIG. 3 is a flow chart illustrating a process for data splitting of recursive data structures.

The process of data splitting recursive data structures can be performed within a software development data processing system as shown in FIG. 2. Specifically, a host computing platform 210 can include an operating system 220 supporting the operation of a compiler 230. The compiler 230 can be coupled to both a memory pool manager 240 and a maximal data splitter 250. Both the memory pool manager 240 and the maximal data splitter 250 can be communicatively linked to a memory pool 260 including multiple different pool units 270, each defined and managed by the memory pool manager 240. The maximal splitter 250, itself, can process the pool units 270 as arrays when performing maximal data splitting.

The memory pool manager 240 can include program code such as that found in a linkable library wherein the program code has been enabled to intercept memory allocation calls within source code for instances of recursive data structures and to allocate a memory area for each data field instance of the instances of the recursive data structures within different pool units 270 in the memory pool 260. In this regard, field instances for each instance of the recursive data structures can be placed into a common set of the pool units 270. Furthermore, at runtime, field instances that are allocated temporally closely are placed into the same one of the pool units 270 in the common set. Thereafter, each of the pool units 270 can be viewed as a separate array and processed accordingly by the maximal data splitter 250.

To facilitate the interception of memory allocation calls and the allocation of memory areas within the memory pool 260, an interface to the memory pool manager 240 can be provided. The interface can include an allocation routine, a de-allocation routine, a pool set initialization routine, and a pool set unit initialization routine. The allocation routine can include program code enabled to find a pool unit that has a vacant position and to reserve that position for a new data object. The program code can be further enabled to set the bit-map of the pool unit accordingly to indicate that the position is already taken, and to return a char* type pointer to point to the base field of the new data object.

The de-allocation routine, by comparison, can include program code enabled to reset the bit-map of the hosting pool unit, and to indicate that the referenced position is free for a new allocation request. Finally, the pool set initialization routine can include program code to initialize a memory pool set for a data type determined to be split. The program code can be enabled to clear a counter of existing data objects in the memory pool set, and to reserve pool units for use in servicing allocation requests. Correspondingly, the pool set unit initialization routine can include program code enabled to initialize a bit-map for a new pool unit. The memory pool set initialization routine can be called for each different aggregate data type, while the pool set unit initialization routine can be called for each new pool set unit created in a corresponding memory pool set.

Figure 3:
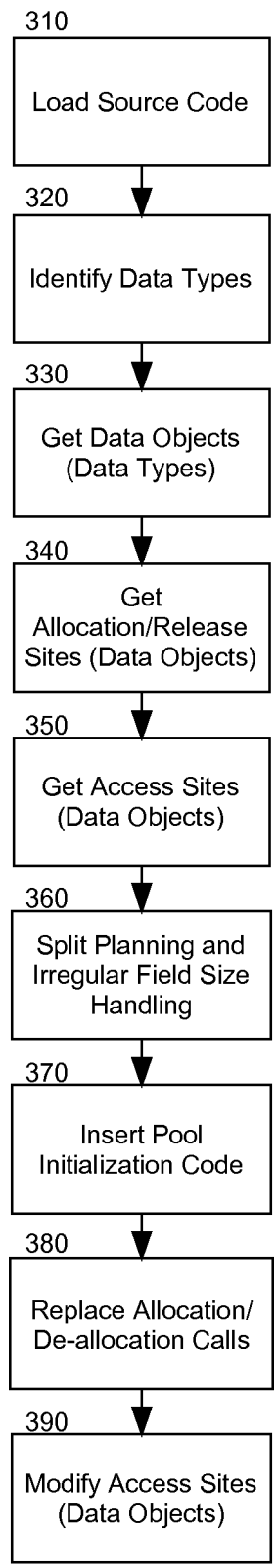

The process performed in the system of FIG. 2 to performance engineer source code to provide for data splitting of recursive data structures is shown in FIG. 3. Beginning in block 310, source code defining one or more data objects reflecting a recursive data structure can be loaded for processing. In block 320, the different data types for the different recursive data structures can be identified and in block 330, different objects created for the different data types for the different recursive data structures further can be identified. Also, in block 340 different allocation and release operations for the objects can be identified in the source code, and in block 350 different data access operations further can be identified in the source code.

In block 360, a plan for splitting the data type is generated. The data objects in the same memory pool form an array. Therefore, traditional maximal array splitting can be applied. In situations in which the fields in the data type are of different sizes, one of three approaches can be taken. First, smaller fields can be padded so that the smaller fields become of the same size of other larger fields. Second, smaller fields can be coalesced into the same size as other larger fields. Third, larger fields can be split into multiple smaller fields, each of which can be of the same size of other smaller fields. In any case, at runtime, the split fields can be loaded and assembled into the original field.

In block 370, a memory pool unit set initialization routine call for the memory pool manager can be inserted into the source code for each different identified data type. Additionally, in block 380, each memory allocation function call for each object in the source code can be replaced with an allocation routine call to the memory pool manager. Correspondingly, each de-allocation function call for each object in the source code can be replaced with a de-allocation routine call to the memory pool manager. Because each memory pool unit is of constant size, the pool unit can only hold a fixed amount of data objects. Assuming that the maximal number of data objects able to be held by a pool unit is x, after processing by the memory pool manager, the corresponding fields of the elements in a pool unit can form a single array. Moreover, different fields form different arrays and the arrays can be placed contiguously.

It will be recognized by the skilled artisan that in the memory pool, the fields of the same data object do not necessarily reside in adjacent memory areas. Rather, a fixed distance, $x*E$, is provided between each pair of the fields. Original pointers pointing to data objects implementing a recursive data structure can be replaced by char type pointers that point to the base fields. To access a particular satellite field from the pointer to the base field, a fixed offset can be added to the pointer to the base field in order to resolve the address of the satellite field. For example, the original allocation functional call

```
FOO_TYPE *p = malloc(sizeof(FOO_TYPE));
p->f1 = p->f2 = p->f3 = 0;
p->f4 = NULL;
``` can be processed into

```
char *p' = memory_pool_manager_allocate(memory_pool_id);
* ((int*)p') = *((int*) (p'+ x*E)) = *((int*) (p'+ 2*x*E)) = 0;
*((char*) (p'+ 3*x*E)) = NULL;
```

In that both x and E are determined at compilation time and are runtime constants, the foregoing offset calculation can be replaced by the compiler with a constant offset. Hence, unlike the extra addressing overhead incurred by maximal splitting techniques applied to basic arrays, the process of FIG. 3 provides for the same addressing overhead so long as the pool unit size is selected strategically to accommodate the size of the data objects implementing the recursive data structure. In any event, returning to FIG. 3, in block 390, each data access function call to each data object implementing a recursive data structure in the source code can be modified to assure correspondence with the modified referencing of the data object.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for data splitting recursive data structures, the method comprising:
   identifying a data object of a recursive data structure type within source code, the recursive data structure type defining a plurality of data fields;
   grouping the data objects of the same data type into a set of memory pool units, each of which containing an identical number of data objects, the data objects in each of the memory pool units forming an array, by inserting a call to initialize a memory pool unit set for the data object of the identified recursive data structure type, replacing an allocation call for the data object with a call to an allocation routine in an interface to a manager of the memory pool, the manager grouping the data objects of the common data type into the common set of memory pool units in response to an invocation of the allocation routine, each memory pool being an array of the data object, and further replacing a de-allocation call for the data object with a call to a de-allocation routine in the interface to the manager of the memory pool, the manager freeing access to the memory pool unit set in response to an invocation of the de-allocation routine; and, performing conventional array splitting in the memory pool units.

2. The method of claim 1, wherein identifying a data object of a recursive data structure type within source code, comprises identifying a data object of a recursive data structure type within source code, the recursive data structure type defining a plurality of data fields.

3. The method of claim 1, wherein performing conventional array splitting in the memory pool units, comprises performing conventional maximal array splitting on each different memory pool unit.

4. The method of claim 1, further comprising padding the data fields in the data object to be of a uniform size.

5. The method of claim 1, further comprising coalescing data fields into sets of fields, all of the sets being of the common size.

6. The method of claim 1, further comprising:
splitting a larger of the data fields into smaller data fields of uniform size; and,
re-assembling the smaller data fields into the larger of the data fields at runtime.

7. A software development data processing system comprising:
a computer with at least one processor and memory;
a compiler;
a set of memory pool units in the memory;
a memory pool manager for the memory pool executing in the computer, the manager comprising program code enabled to identify data objects of a recursive data structure type within source code, and to group the data objects into a common set of the memory pool units by inserting call to initialize a memory pool unit set for the data object of the identified recursive data structure type, replacing an allocation call for the data object with a call to an allocation routine in an interface to a manager of the memory pool, the manager grouping the data objects of the common data type into the common set of memory pool units in response to an invocation of the allocation routine, each memory pool being an array of the data object, and further replacing a de-allocation call for the data object with a call to a de-allocation routine in the interface to the manager of the memory pool, the manager freeing access to the memory pool unit set in response to an invocation of the de-allocation routine; and,
an array splitter coupled to the memory pool and configured to data split each different memory pool unit in the set of memory pool units.

8. The system of claim 7, wherein the data splitter is configured to perform maximal array splitting.

9. The system of claim 7, wherein the memory pool manager is a linkable library comprising an interface to a memory pool unit set initialization routine, a memory pool unit initialization routine, an allocation routine and a de-allocation routine.

10. A computer program product comprising a computer usable storage memory device storing computer usable program code for data splitting recursive data structures, the computer program product comprising:
computer usable program code for identifying a data object of a recursive data structure type within source code, the recursive data structure type defining a plurality of data fields;
computer usable program code for grouping the data objects of the same data type into a set of memory pool units, each of which containing an identical number of data objects, the data objects in each of the memory pool units forming an array, by inserting a call to initialize a memory pool unit set for the data object of the identified recursive data structure type, replacing an allocation call for the data object with a call to an allocation routine in an interface to a manager of the memory pool, the manager grouping the data objects of the common data type into the common set of memory pool units in response to an invocation of the allocation routine, each memory pool being an array of the data object, and further replacing a de-allocation call for the data object with a call to a de-allocation routine in the interface to the manager of the memory pool, the manager freeing access to the memory pool unit set in response to an invocation of the de-allocation routine; and,
computer usable program code for performing conventional array splitting in the memory pool units.

11. The computer program product of claim 10, wherein the computer usable program code for identifying a data object of a recursive data structure type within source code, comprises identifying a data object of a recursive data structure type within source code, the recursive data structure type defining a plurality of data fields.

12. The computer program product of claim 10, wherein the computer usable program code for performing conventional array splitting in the memory pool units, comprises computer usable program code for performing conventional maximal array splitting on each different memory pool unit.

13. The computer program product of claim 10, further comprising computer usable program code for padding the data fields in the data object to be of a uniform size.

14. The computer program product of claim 10, further comprising computer usable program code for coalescing data fields into sets of fields, all of the sets being of the common size.

15. The computer program product of claim 10, further comprising:
computer usable program code for splitting a larger of the data fields into smaller data fields of uniform size; and,
computer usable program code for re-assembling the smaller data fields into the larger of the data fields at runtime.

* * * * *